United States Patent
Hackman

(10) Patent No.: US 10,639,756 B2
(45) Date of Patent: May 5, 2020

(54) TOOLS WITH REMOVABLE INFORMATION DEVICE

(71) Applicant: GLEASON CUTTING TOOLS CORPORATION, Loves Park, IL (US)

(72) Inventor: Roger L. Hackman, Winnebago, IL (US)

(73) Assignee: GLEASON CUTTING TOOLS CORPORATION, Loves Park, IL (US)

( * ) Notice: Subject to any disclaimer, the term of this patent is extended or adjusted under 35 U.S.C. 154(b) by 146 days.

(21) Appl. No.: 15/572,916

(22) PCT Filed: Jun. 2, 2016

(86) PCT No.: PCT/US2016/035499
§ 371 (c)(1),
(2) Date: Nov. 9, 2017

(87) PCT Pub. No.: WO2016/195781
PCT Pub. Date: Dec. 8, 2016

(65) Prior Publication Data
US 2018/0126505 A1 May 10, 2018

Related U.S. Application Data

(60) Provisional application No. 62/171,274, filed on Jun. 5, 2015.

(51) Int. Cl.
*B23F 23/12* (2006.01)
*B23F 5/22* (2006.01)
(Continued)

(52) U.S. Cl.
CPC ........ *B23Q 3/15546* (2013.01); *B23B 31/006* (2013.01); *B23F 5/22* (2013.01);
(Continued)

(58) Field of Classification Search
CPC ............ B23Q 3/15546; B23Q 17/0995; B23B 2231/10; Y10T 483/134; Y10T 409/30952; G05B 2219/49304; G05B 2219/49305
(Continued)

(56) References Cited

U.S. PATENT DOCUMENTS 3,858,892 A * 1/1975 Rutschke ........... B23Q 3/15546
279/9.1
4,588,339 A * 5/1986 Bilz ...................... B23B 31/006
279/126
(Continued)

FOREIGN PATENT DOCUMENTS

DE 19910935 A1 * 9/2000
DE 102008051908 A1 4/2010
(Continued)

OTHER PUBLICATIONS

Machine Translation JP 05-093733 U, which JP '733 was published Dec. 1993.*
(Continued)

*Primary Examiner* — Erica E Cadugan
(74) *Attorney, Agent, or Firm* — Robert L. McDowell

(57) ABSTRACT

A removable assembly (38) comprising an information holding unit (36). The removable assembly is positionable in a material object (2), such as a tool, tool component or part, machine, machine component or part, device, etc., and can be removed therefrom by fluid pressure whereby the material object can be subjected to processing that would otherwise cause damage to, or destroy, the information holding unit (36).

15 Claims, 6 Drawing Sheets

(51) Int. Cl.
  *B23B 31/00* (2006.01)
  *G06K 19/00* (2006.01)
  *B23Q 3/155* (2006.01)

(52) U.S. Cl.
  CPC .......... *B23F 23/12* (2013.01); *B23F 23/1237* (2013.01); *G06K 19/005* (2013.01); *B23B 2231/10* (2013.01); *B23B 2270/36* (2013.01); *G05B 2219/49304* (2013.01); *G05B 2219/49305* (2013.01); *Y10T 407/1715* (2015.01); *Y10T 407/1745* (2015.01); *Y10T 409/30952* (2015.01); *Y10T 483/134* (2015.01)

(58) Field of Classification Search
  USPC .............................................. 483/9; 409/234
  See application file for complete search history.

(56) References Cited

U.S. PATENT DOCUMENTS

| | | | |
|---|---|---|---|
| 4,773,800 A | | 9/1988 | Furuhashi et al. |
| 5,257,199 A | * | 10/1993 | Tsujino ................ G05B 19/128 235/375 |
| 5,692,998 A | * | 12/1997 | Weigel ............... B23Q 3/15546 279/126 |
| 6,334,587 B1 | | 1/2002 | Roder |
| 6,585,628 B1 | * | 7/2003 | Tsung ...................... B23C 5/00 408/16 |
| 8,376,671 B2 | * | 2/2013 | Kaneko .............. B23Q 3/15546 279/126 |
| 2009/0175694 A1 | | 7/2009 | Craig et al. |
| 2012/0129434 A1 | | 5/2012 | Hackman et al. |
| 2012/0146794 A1 | | 6/2012 | Shachar et al. |
| 2013/0057387 A1 | | 3/2013 | Binmore |
| 2019/0039149 A1 | * | 2/2019 | Haimer .................. B23B 31/02 |

FOREIGN PATENT DOCUMENTS

| | | | |
|---|---|---|---|
| EP | 155662 A2 | * | 9/1985 |
| JP | 58-102650 A | * | 6/1983 |
| JP | 63-185546 A | * | 8/1988 |
| JP | 05-093733 U | * | 12/1993 |
| WO | 2009/027631 A1 | | 3/2009 |
| WO | 2013/183998 A1 | | 12/2013 |

OTHER PUBLICATIONS

International Search Report and Written Opinion for PCT/US2016/035499, ISA/EPO, dated Sep. 14, 2016, 14 pages.

* cited by examiner

Tool and Removable Assembly Each Coded with Like Symbols or Colors

FIG. 9

Processing Comprising At Least One of Stripping a Wear Coating From the Tool, Sharpening the Tool, and Applying a Wear Coating to the Tool

FIG. 10

TOOLS WITH REMOVABLE INFORMATION DEVICE

FIELD OF THE INVENTION

The present invention relates to tools and in particular to cutting tools having a removable information holding device therein.

BACKGROUND OF THE INVENTION

In machining, it is known to include an identifier, such as barcode labels or 2-D barcode labels on machining tools (e.g. cutting tools, grinding tools, etc.) so as to provide identifying information about the tool when the label is scanned by a reader as part of a tool tracking and/or inventory system. The labels can also be utilized to track the tool as it moves about a facility. For example, from a machine to a sharpening room to a storage room, a cutting tool label can be scanned at each location so that the location of the tool is known at all times. When the tool is placed on a machine, the label can be scanned and the tool can be verified as the correct tool for the particular part or job. The labels can also be utilized by the tracking system to count the number of times a tool has been sharpened or to determine the number of parts produced by the tool.

Machining tools may also comprise an information holding unit (i.e. read-only or read/write) such as RFID (Radio Frequency Identification) tags, Wi-Fi chips, etc. for storing and/or conveying information, via an appropriate reading device, for purposes such as described above. In the case of read/write devices, information can be transmitted to, and received from, a tool thereby enabling, for example, a machine to convey information to a tool such as process or workpiece information and have that information read by another machine such as a sharpening machine, a tool tracking/inventory system or by someone inspecting the particular tool.

The location of an identifier may vary due to the type or structure of a tool. For example, RFID tags are known to be placed on a tool holding unit or on a base portion of a tool but not on (or in) the actual cutting blade element attached to the base. Barcode labels are known to be placed on tool packaging or boxes. However, an identifier may become separated from a cutting element such as by placing a different tool on a tool holding unit, misplacing the tool packaging or box, or placing new cutting blades or cutting blade segments on a tool base. In any of these examples, the information on the identifier may become useless.

In many instances, an identifier cannot be placed directly on a portion of a tool that undergoes certain processing such as sharpening, removal of wear coatings or application of wear coatings (e.g. PVD coating process) due to the harsh conditions of the processing. For example, RFID tags cannot survive the high temperatures of applying wear coatings or the harsh chemical and temperature environment of stripping worn coatings from tools.

Some types of gear cutting tools such as certain hobs or shaper cutters are of a unitary construction. There is no accompanying and separable tool holding unit or tool base portion to which an identifier can be attached. As with other machining tools, these types of tools are known to be periodically sharpened and to include wear coatings such that the wear coatings are routinely stripped off, the tool is sharpened and a fresh wear coating is applied. As mentioned above, identifiers such as RFID tags cannot survive these processing steps. Therefore, a solution is sought for providing an identifier for such tools.

SUMMARY OF THE INVENTION

The invention is directed to a removable assembly comprising an information holding unit. The removable assembly is positionable in a material object, such as a tool, tool component or part, machine, machine component or part, device, etc., and can be removed therefrom by fluid pressure whereby the material object can be subjected to processing that would otherwise cause damage to, or destroy, the information holding unit.

BRIEF DESCRIPTION OF THE DRAWINGS

FIG. 9 schematically illustrates a further feature of an assembly.

FIG. 10 schematically illustrates examples of processing.

DETAILED DESCRIPTION OF THE PREFERRED EMBODIMENT

Figure 1:
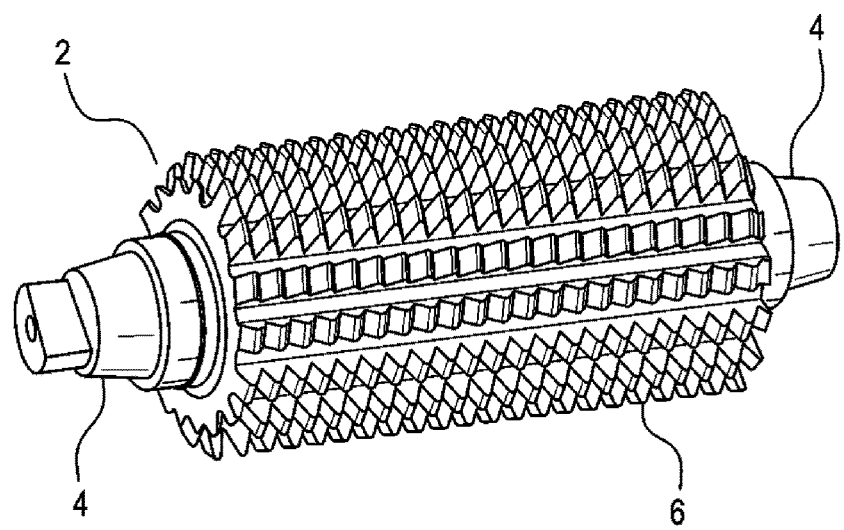
FIG. 1 shows a conventional gear hob.

The terms "invention," "the invention," and "the present invention" used in this specification are intended to refer broadly to all of the subject matter of this specification and any patent claims below. Statements containing these terms should not be understood to limit the subject matter described herein or to limit the meaning or scope of any patent claims below. Furthermore, this specification does not seek to describe or limit the subject matter covered by any claims in any particular part, paragraph, statement or drawing of the application. The subject matter should be understood by reference to the entire specification, all drawings and any claim below. The invention is capable of other constructions and of being practiced or being carried out in various ways. Also, it is understood that the phraseology and terminology used herein is for the purposes of description and should not be regarded as limiting.

The use of "including", "having" and "comprising" and variations thereof herein is meant to encompass the items listed thereafter and equivalents thereof as well as additional items. Although references may be made below to directions such as upper, lower, upward, downward, rearward, bottom, top, front, rear, etc., in describing the drawings, there references are made relative to the drawings (as normally viewed) for convenience. These directions are not intended to be taken literally or limit the present invention in any form.

The details of the invention will now be discussed with reference to the accompanying drawings which illustrate the invention by way of example only. In the drawings, similar features or components will be referred to by like reference numbers.

Figure 2:
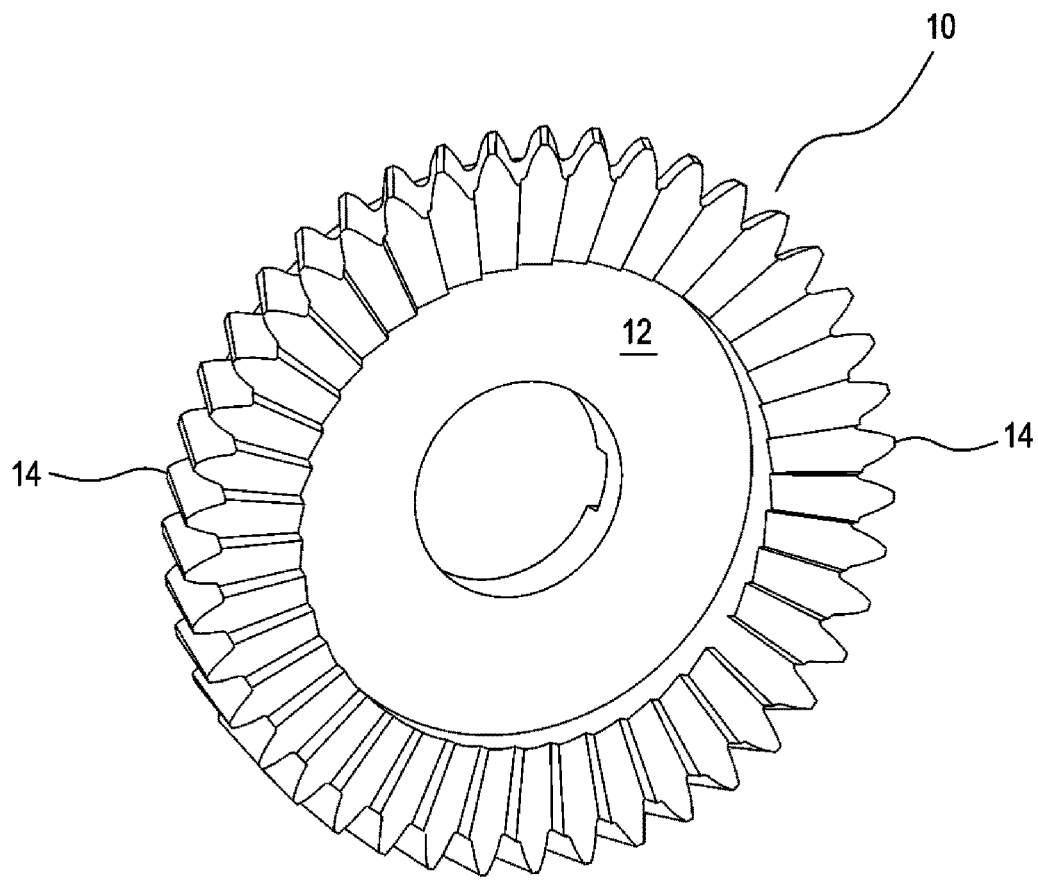
FIG. 2 illustrates a conventional gear shaper cutter.

FIG. 1 shows a type of conventional hobbing tool 2 (i.e. hob) for cutting (roughing or finishing) spur or helical gears. The hob comprises tapered ends or shanks 4 and cutting teeth 6 spirally-arranged about the hob and extending along the length thereof. FIG. 2 illustrates a conventional gear shaping tool 10 (i.e. shaper cutter) for cutting (roughing or finishing) spur or helical gears having a disc-shaped base portion 12 and a plurality of shaping teeth 14 arranged proximate one face of the base portion 12 and extending generally axially therefrom. The basic structures of hobs and shaper cutters are well within the purview of the skilled artisan and a further detailed discussion thereof is not necessary in order to understand the present invention.

As mentioned above, it is known to utilize identifiers on a tool or its packaging to store information about the tool. Of particular interest are read-only or read/write information holding units such as RFID tags, for example, for storing and/or conveying information related to the tool. However, such information holding units are currently not able to withstand certain harsh processing conditions such as, for example, the high temperature and/or chemical environments associated with stripping of wear coatings from a tool or the application of wear coatings onto a tool. Therefore, for tools wherein information holding units would preferably be located on a portion of the tool that is exposed to harsh processing, as is the case with one-piece or "solid" tools in particular, such preferred placement has heretofore been impossible.

Figure 3:
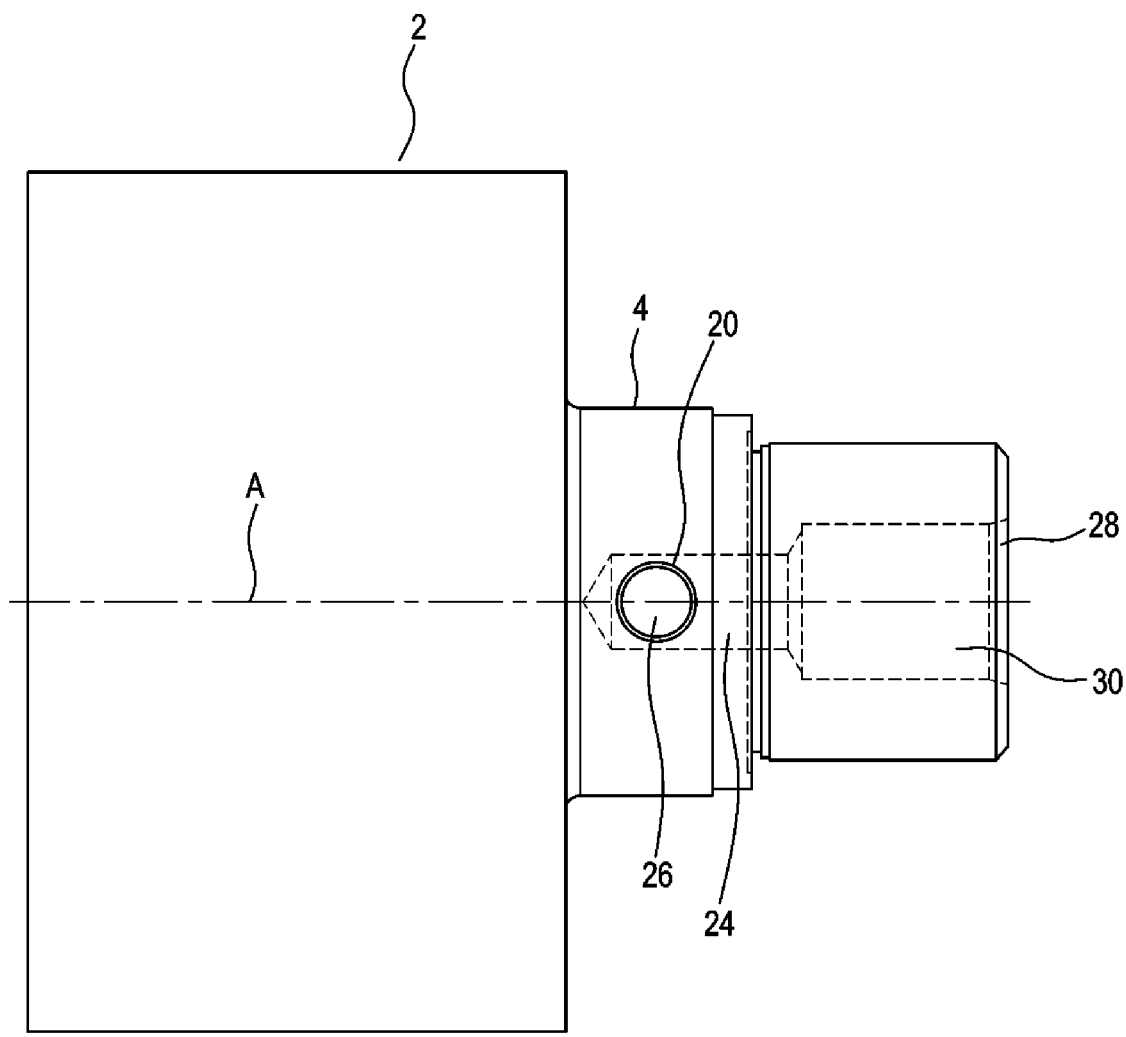
FIG. 3 shows one end of a gear hob with a passageway extending through the shank of the hob.
Figure 4:
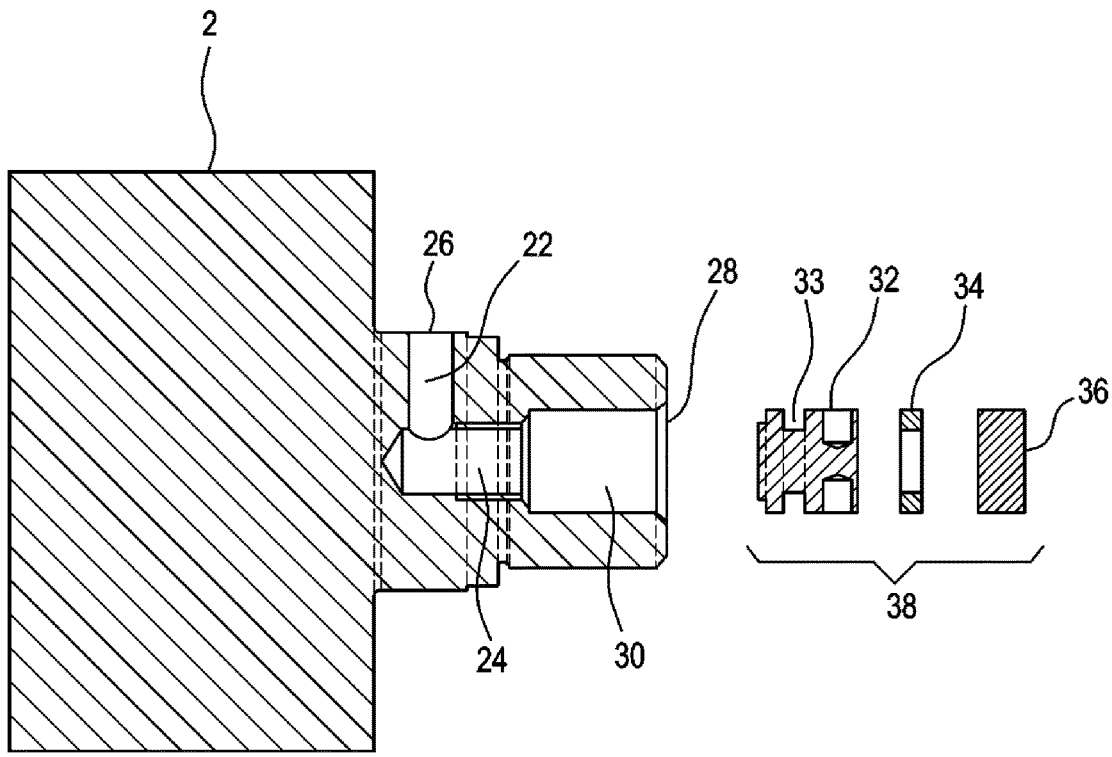
FIG. 4 shows the components of a removable assembly adjacent to their intended location in an outer portion of a hob shank.
Figure 5:
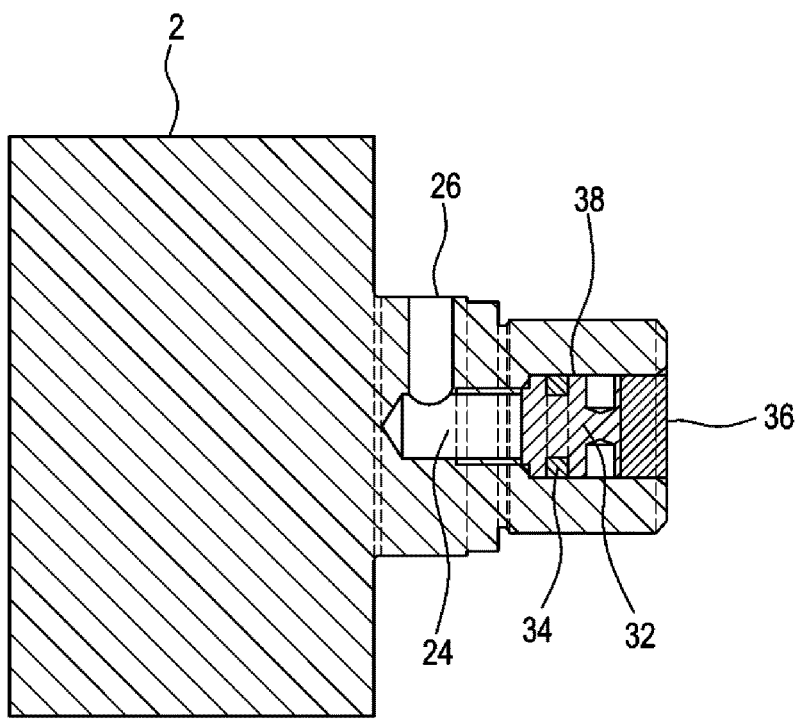
FIG. 5 illustrates a removable assembly positioned in an outer portion of a hob shank.

FIGS. 3, 4 and 5 illustrates an example of the invention wherein a hob 2 (shown in partial view) rotatable about an axis A is provided with a passageway 20 formed in a shank 4 thereof. In this particular embodiment, passageway 20 comprises a radial channel 22 in fluid communication with an axial channel 24. Radial channel 22 has an opening 26 and axial channel 24 has an opening 28. The diameter of passageway 20 may be of any suitable dimension desired. For example, passageway 20 may have a diameter in the range of about 0.10-0.30 inch (2.5-7.6 mm).

An outer portion 30 of the length of axial channel 24 is provided with a diameter larger than the diameter of the remaining (inner) portion of axial channel 24. Outer portion 30 is of a diameter and length sufficient to accommodate a carriage 32, seal 34 such as an O-ring for example, and an information holding unit 36 such as, for example, a Radio Frequency Identification (RFID) tag or chip as is commercially available from Balluff Inc. and others. See FIG. 4. The diameter of outer portion 30 is preferably greater than the diameter of passageway 20. For example, outer portion 30 may have a diameter of about 0.40-0.60 inch (10.2-15.2 mm). Carriage 32 is preferably made of steel but could be made from other materials, for example, synthetic polymers such as Nylon, particularly Nylon 6/6.

The seal 34 is positioned on carriage 32 preferably via an appropriate locating area such as circumferential groove 33 and the information holding unit 36 is affixed to carriage 32 by any suitable means, such as glue or other adhesive for example. Preferably, groove 33 and seal 34 are located near to the inner end of carriage 32 and information holding unit 36 is located at or on the outer end of carriage 32. The carriage 32, seal 34 and information holding unit 36 collectively form a removable assembly 38 that is inserted into outer portion 30 and is held in place due to the contact between the seal 34 and the surface of the outer portion 30. See FIG. 5. The length of the assembly 38 is dependent on the tool design and the amount of stock material available for forming the outer portion 30. For example, assembly 38 may range in length from 0.20-1.0 inch (5.1-25.4 mm). The length of the carriage 32 may be adjusted as needed. The length of outer portion 30 is preferably the same as that of the removable assembly 38.

Information relevant to the tool (e.g. hob 2), workpiece formed by the tool and/or the machine on which the tool is mounted, for example, can be written to, and/or read from, the information holding unit 36. When the hob is to undergo certain processing under harsh conditions that could damage or destroy the information holding unit 36, such as stripping of a wear coating (e.g. prior to sharpening), sharpening, or the application of a wear coating (e.g. after sharpening), all as schematically shown in FIG. 10, the assembly 38 is removable from the outer portion 30 of the hob by the application of sufficient fluid pressure, preferably air pressure, via opening (i.e. inlet) 26 so as to eject the assembly 38 from the outer portion 30. For example, fluid pressure may be supplied in the form of normal shop air at a pressure range of about 50-80 pounds per square inch gauge (psig).

Once the assembly 38 has been removed from a hob, the hob may be processed in the same manner as a conventional hob without the inventive feature. Openings 26 and 28 should be covered or shielded to prevent the inflow of process chemicals or coating compositions. Once processing is complete, the previously-removed assembly may be inserted back into outer portion 30 or another assembly (e.g. new) may be inserted.

Figure 6:
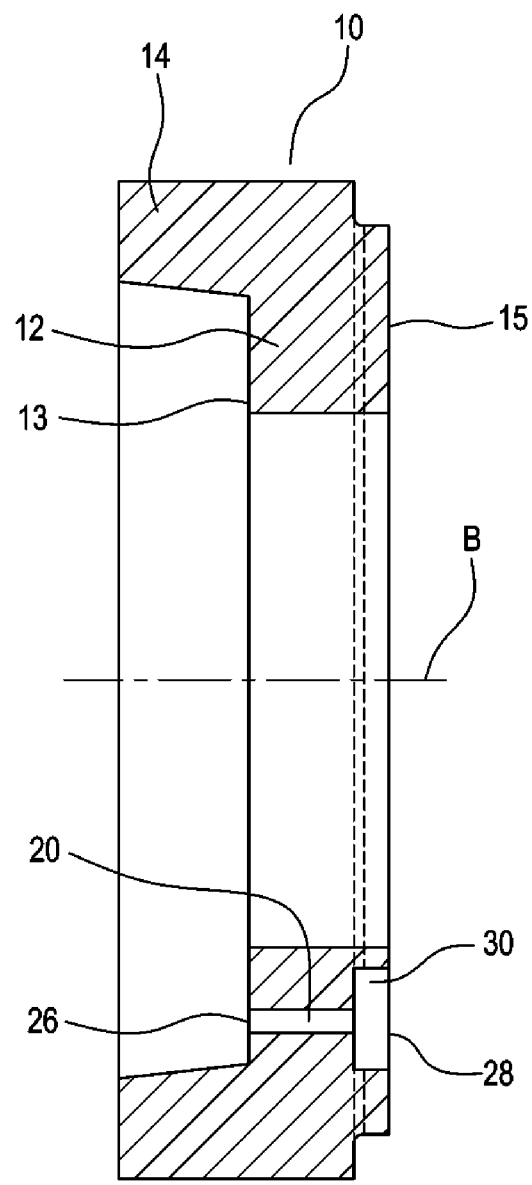
FIG. 6 shows a gear shaper cutter with a passageway extending through the base of the cutter.
Figure 7:
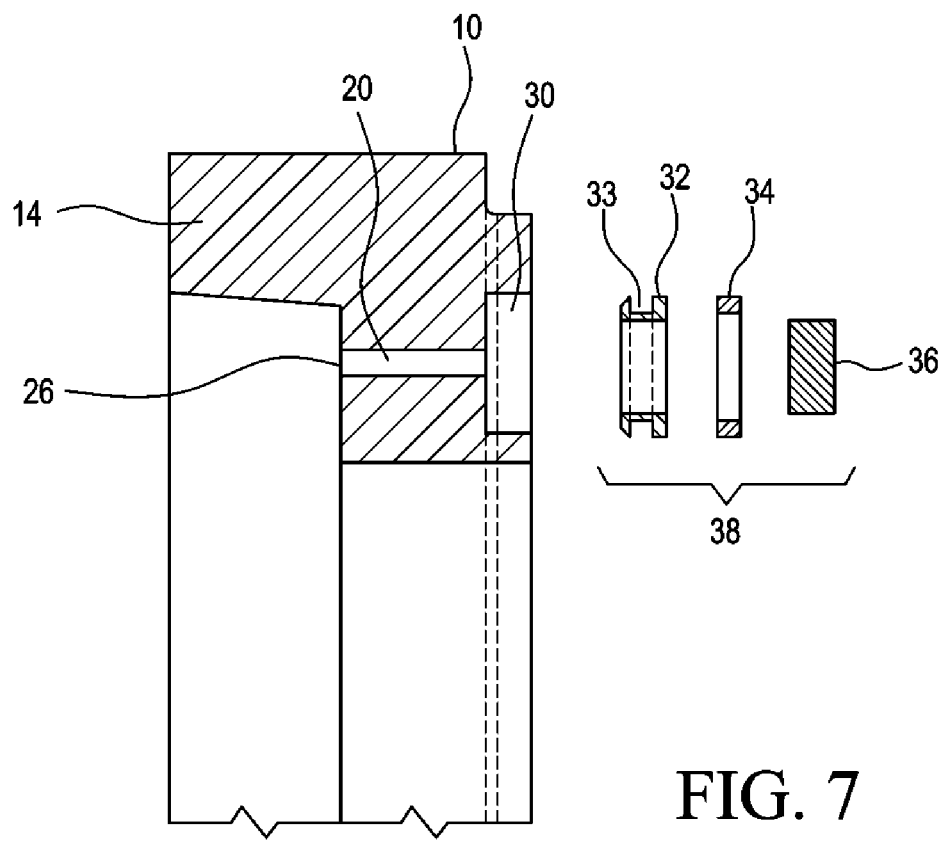
FIG. 7 shows the components of a removable assembly adjacent to their intended location in an outer portion of a shaper cutter.
Figure 8:
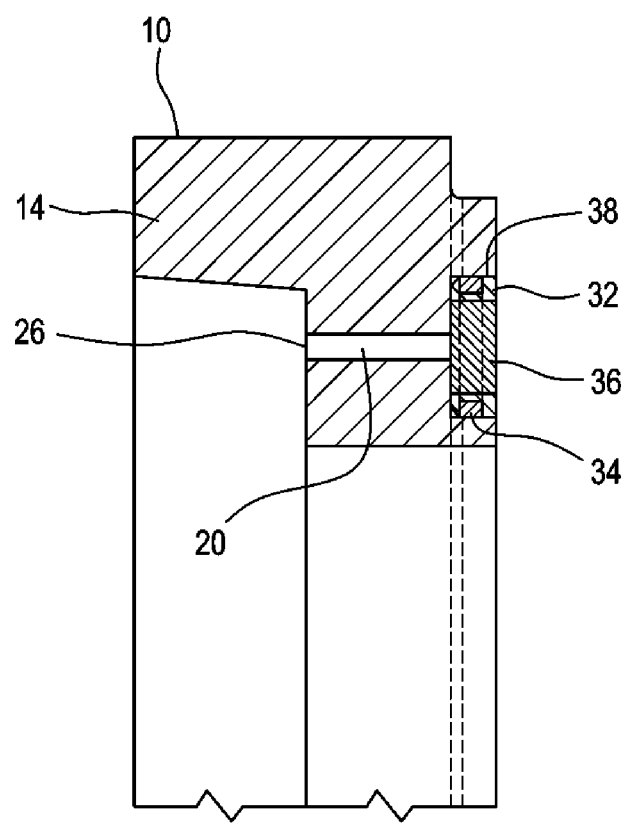
FIG. 8 illustrates a removable assembly positioned in an outer portion of a shaper cutter.

FIGS. 6, 7 and 8 illustrate another example of the invention wherein a shaper cutter 10 rotatable about an axis B includes a passageway 20 extending axially from the opening 26 (i.e. inlet) at the inner surface 13 of the tool body 12 to outer portion 30 and opening 28 located in the opposing outer surface 15 of the tool body. The carriage 32 of assembly 38 (FIG. 7) is shorter in length than the carriage shown for the hob (FIG. 4) due to the reduced thickness in the axial direction of the shaper cutter body compared to the hob shank. Additionally, the information holding unit 36 is affixed to carriage 32 by any suitable means, such as glue or other adhesive for example. However, instead of being adhered to an outside surface of the carriage 32 as shown in FIG. 5, the information holding unit 36 is positioned within carriage 32. Such placement contributes to a reduced length of the assembly 38 of FIG. 8 in comparison to the assembly of FIG. 5.

The invention is not limited to the recited dimensions, the particular directions at which the passageway extends or to the number of channels that comprise the passageway. A tool and its associated removable assembly may each be coded in some manner (e.g. like colors, numbers, letters and/or other symbols as schematically depicted in FIG. 9) in order to match them again, if desired, after ejection of the assembly and subsequent processing.

Although the invention has been discussed and illustrated with respect to tools (e.g. hobs and shaper cutters) for producing gears, the invention is not limited thereto. Any material object (e.g. tool, tool component or part, machine, machine component or part, device, etc.) associated with an information holding unit and which undergoes any form of process or treatment having the potential to damage or destroy the information holding unit would benefit from the invention.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A gear producing assembly for producing gears, the assembly comprising:
a gear cutting tool comprising a passageway having a first opening at one end of the passageway and having a second opening at an opposite end of the passageway;
a removable assembly comprising an information holding unit wherein said removable assembly is positionable in said passageway, and
wherein said removable assembly is configured to be held in place in the passageway via a seal, and is configured to be removed from the second opening via fluid pressure against the removable assembly via fluid provided to the first opening.

2. The gear producing assembly of claim 1 wherein said first opening comprises an inlet for said fluid pressure, said first opening and said second opening being in fluid communication with one another.

3. The gear producing assembly of claim 1 wherein said removable assembly further comprises a carriage.

4. The gear producing assembly of claim 3 wherein said information holding unit is located within said carriage.

5. The gear producing assembly of claim 1 wherein said removable assembly further comprises the seal.

6. The gear producing assembly of claim 1 wherein said information holding unit comprises a radio frequency identification device.

7. The gear producing assembly of claim 1, wherein the gear cutting tool comprises a hobbing tool.

8. The gear producing assembly of claim 7 wherein said hobbing tool includes a shank, wherein said removable assembly is positionable in and is removable from said shank.

9. The gear producing assembly of claim 1 wherein the gear cutting tool comprises a shaper cutter.

10. The gear producing assembly of claim 9 wherein said shaper cutter comprises a tool body having an outer surface, wherein said removable assembly is positionable in and is removable from said outer surface.

11. The gear producing assembly of claim 1 wherein said gear cutting tool and said removable assembly are each coded with like symbols so as to aid in matching said gear cutting tool and said removable assembly.

12. A method comprising:
providing the gear producing assembly set forth in claim 1;
removing said removable assembly from said tool by applying said fluid pressure to said removable assembly,
processing said tool wherein said processing comprises conditions that would damage or destroy said information holding unit had said information holding unit not been removed from said tool, and
inserting said removable assembly into said tool.

13. The method of claim 12 wherein said processing comprises at least one of the steps of stripping a wear coating from said tool, sharpening said tool and applying a wear coating to said tool.

14. The method of claim 12, wherein said first opening comprises an inlet for said fluid pressure, said first opening and said second opening being in fluid communication with one another.

15. The method of claim 12 wherein said tool comprises a hobbing tool.

* * * * *